Figure 1:
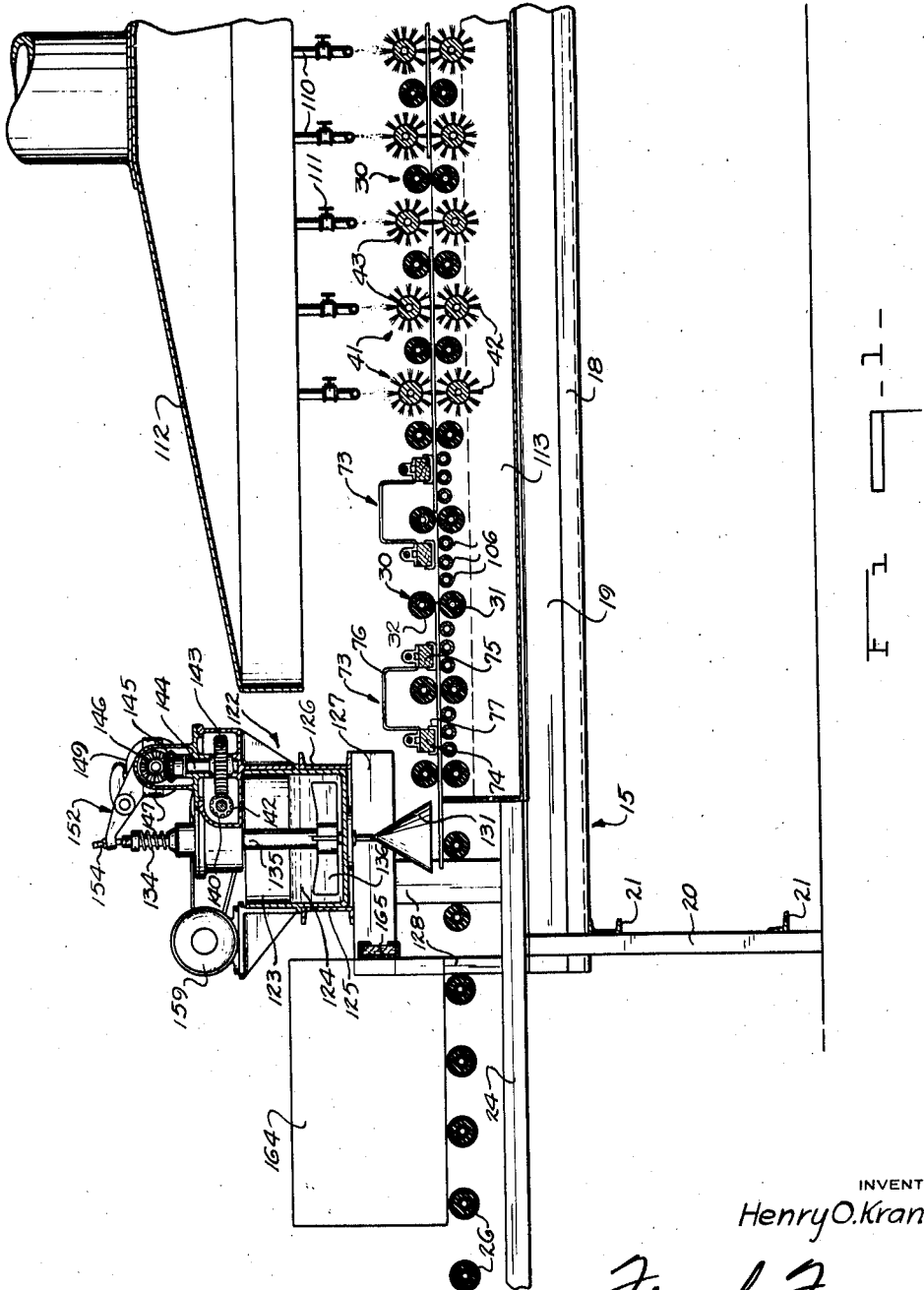

April 3, 1934.  H. O. KRANICH  1,953,352
APPARATUS FOR WASHING FLAT SHEETS OR PLATES
Filed Dec. 3, 1930  8 Sheets-Sheet 1

INVENTOR
Henry O. Kranich

Frank Fraser
ATTORNEY

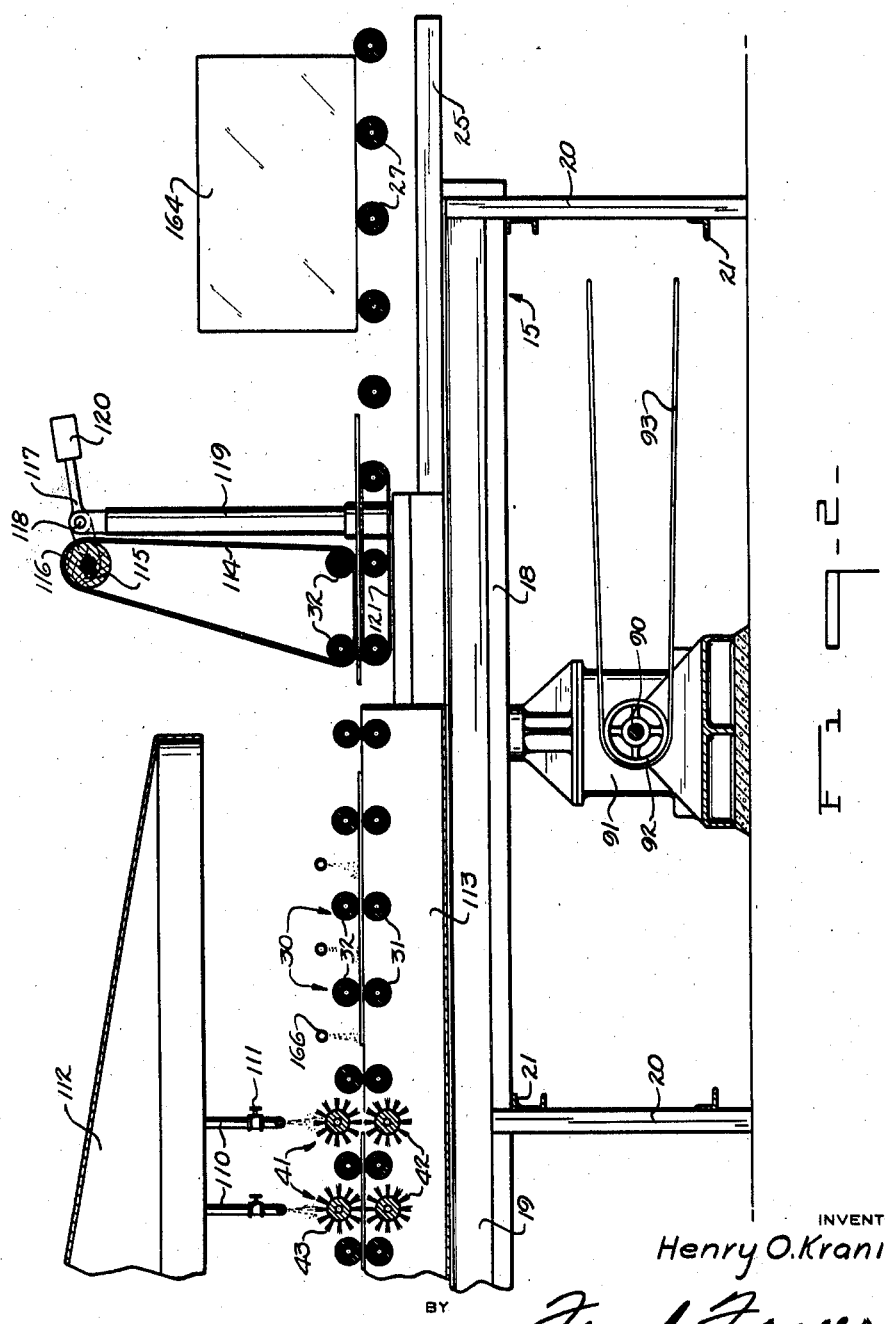

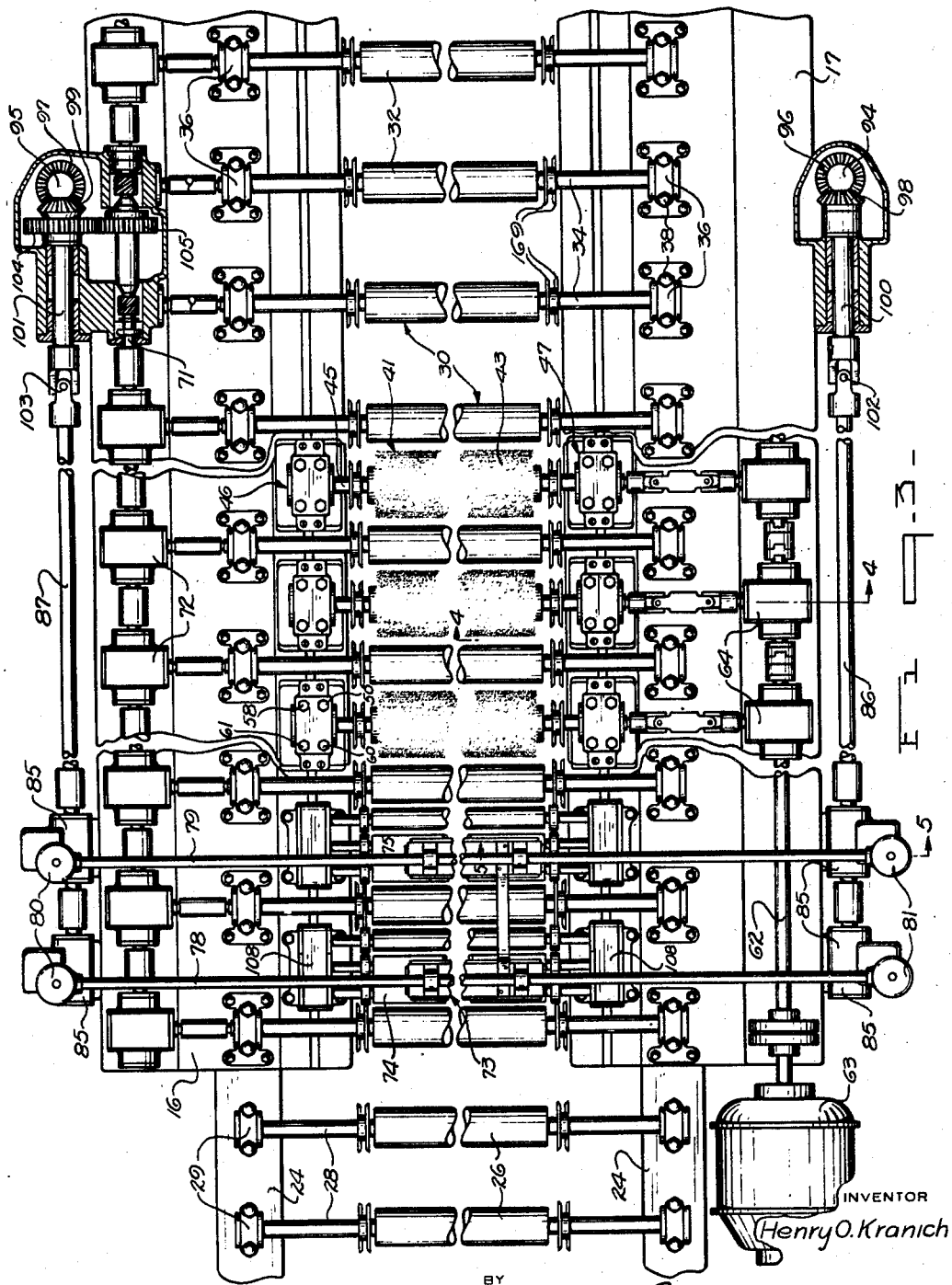

April 3, 1934. H. O. KRANICH 1,953,352
APPARATUS FOR WASHING FLAT SHEETS OR PLATES
Filed Dec. 3, 1930 8 Sheets-Sheet 4
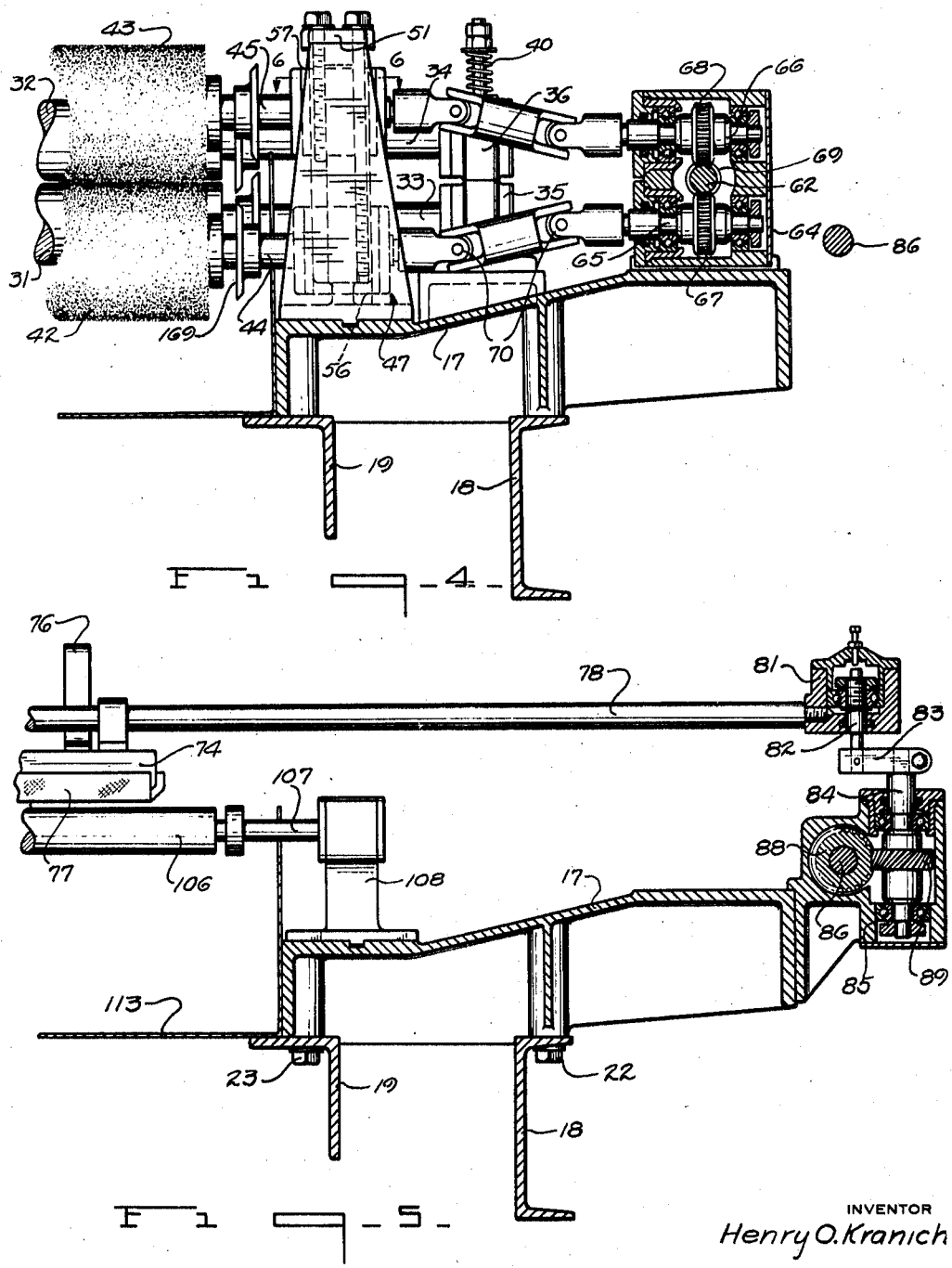
INVENTOR
Henry O. Kranich
BY
Frank Fraser
ATTORNEY April 3, 1934. H. O. KRANICH 1,953,352
APPARATUS FOR WASHING FLAT SHEETS OR PLATES
Filed Dec. 3, 1930 8 Sheets-Sheet 5

INVENTOR
Henry O. Kranich
BY
Frank Fraser
ATTORNEY

April 3, 1934. H. O. KRANICH 1,953,352
APPARATUS FOR WASHING FLAT SHEETS OR PLATES
Filed Dec. 3, 1930 8 Sheets-Sheet 6
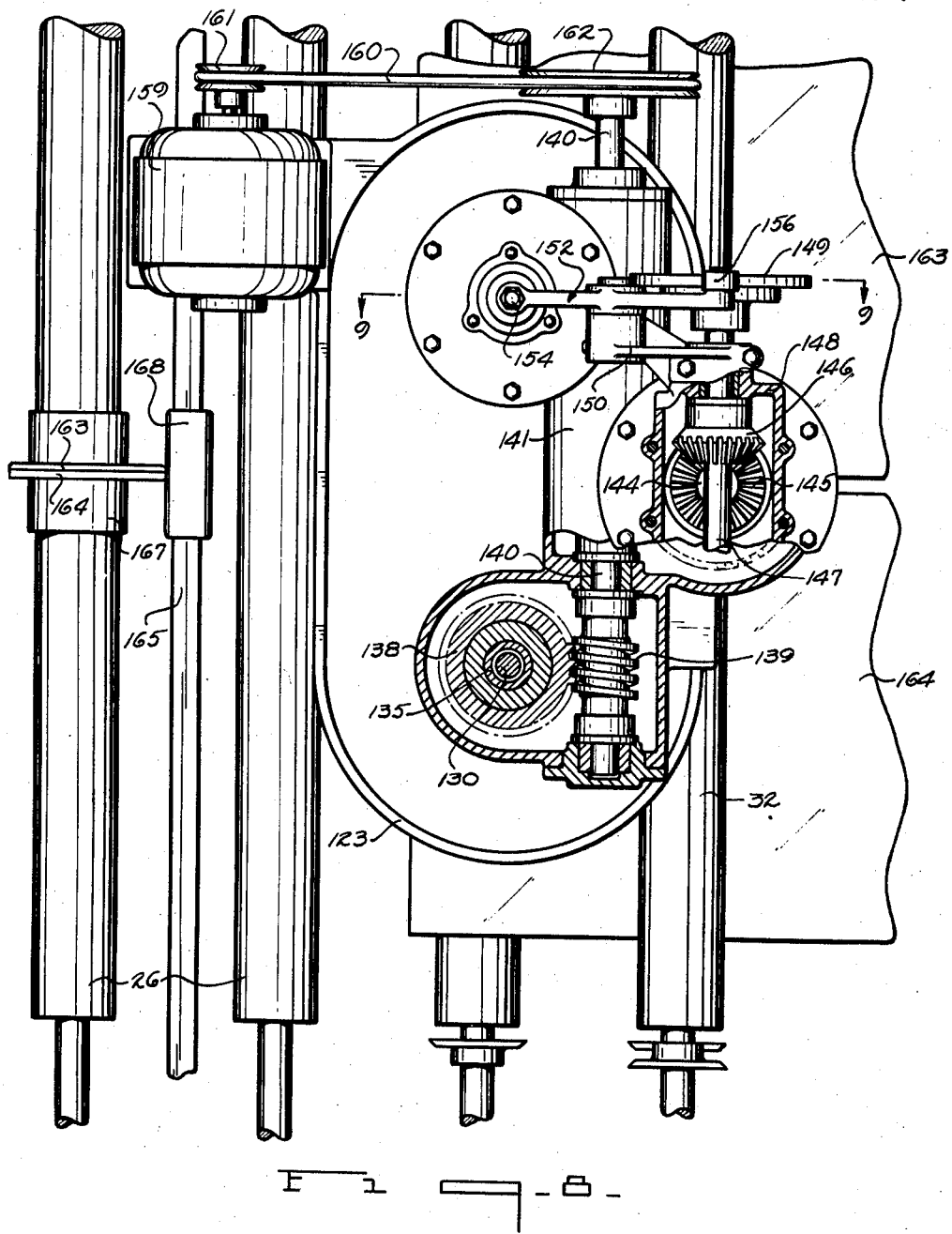
INVENTOR
Henry O. Kranich
BY
Frank Fraser
ATTORNEY April 3, 1934.
H. O. KRANICH
1,953,352
APPARATUS FOR WASHING FLAT SHEETS OR PLATES
Filed Dec. 3, 1930
8 Sheets-Sheet 7
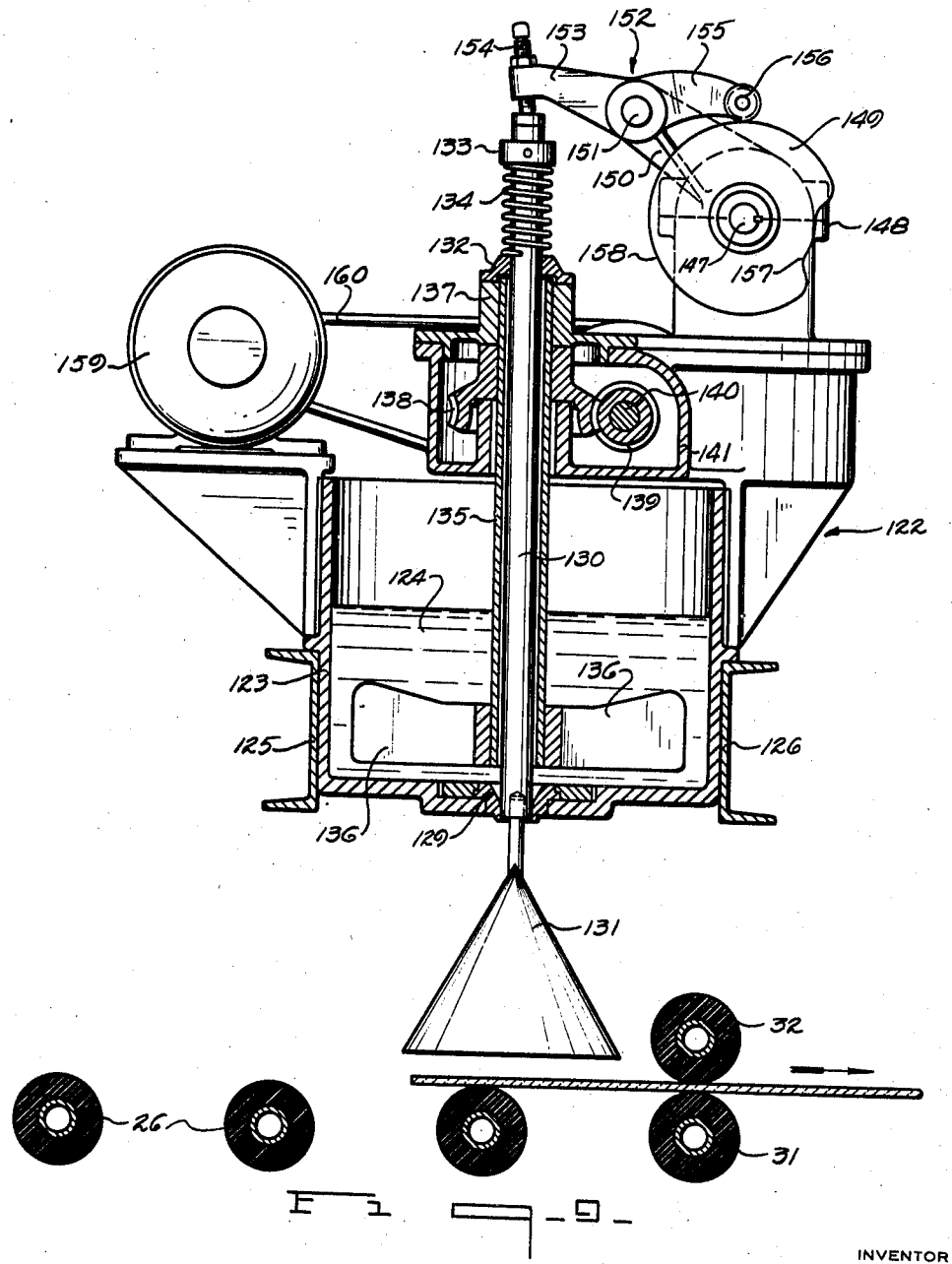
INVENTOR
Henry O. Kranich
BY
Frank Fraser
ATTORNEY

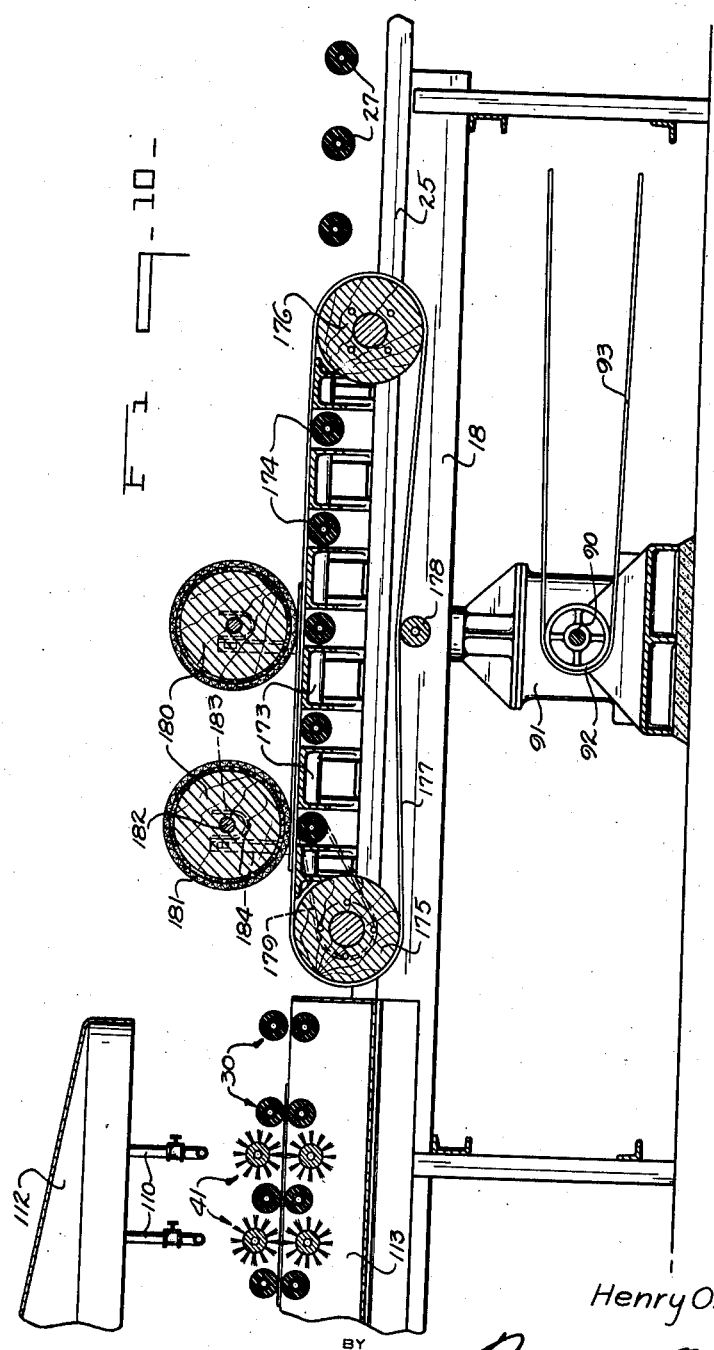

Patented Apr. 3, 1934

1,953,352

UNITED STATES PATENT OFFICE 1,953,352

APPARATUS FOR WASHING FLAT SHEETS OR PLATES

Henry O. Kranich, Toledo, Ohio, assignor to Libbey-Owens-Ford Glass Company, Toledo, Ohio, a corporation of Ohio Application December 3, 1930, Serial No. 499,667

6 Claims. (Cl. 15—77)

The present invention relates broadly to washing and cleaning apparatus and more particularly to a machine for the washing and cleaning of glass sheets or other flat sheets or plates.

While it is to be fully understood that the present invention is not limited to any specific use, yet the machine herein provided has been particularly designed for the washing and cleaning of glass sheets or plates, and especially those which are to be used in the manufacture of laminated or non-shatterable glass. Briefly stated, laminated glass consists essentially of two or more sheets of glass having one or more sheets of a suitable non-brittle material interposed therebetween and bonded thereto to provide a composite or unitary structure. In order to secure the glass and non-brittle material together, a suitable bond or bond-inducing medium is usually applied either to one face each of the glass sheets or to the opposite surfaces of the non-brittle sheet, or both, after which the several sheets are properly assembled to form a "sandwich" and united preferably by the combined action of heat and pressure. In the manufacture of this type of glass, it is very essential that the surfaces of the glass sheets which are to be secured to the non-brittle material be exceptionally clean and free from all dirt, dust and foreign matter since, in the event these surfaces are not perfectly clean, the bond between the laminations as well as the appearance of the finished composite sheet may be seriously affected as a result of which the commercial value thereof will be greatly impaired.

The general object of the present invention is the provision of a machine for effecting the washing and cleaning of the glass sheets rapidly and conveniently in a thorough and efficient manner, particular attention being paid to the treatment of those surfaces of the sheets which are to be joined to the non-brittle material.

Another object of the invention is the provision of a machine of the above character wherein the washing and cleaning of the glass sheets may be effected in a substantially continuous manner as the sheets are caused to travel therethrough, whereby excessive handling of the sheets and consequent breakage thereof may be reduced to a minimum.

A further object of the invention is the provision of a machine of the above character wherein the glass sheets are introduced into one end thereof and caused to travel continuously therethrough, the said sheets being successively scrubbed, washed and wiped during such travel and delivered from the machine both clean and dry.

A still further object of the invention is the provision of novel means for scrubbing the glass sheets prior to the washing thereof, together with novel means for automatically applying a suitable cleaning medium to the glass sheets prior to such scrubbing.

The machine provided by the present invention also embodies various other novel features of construction, arrangement and operation, all of which will be more fully hereinafter apparent.

Figure 6:
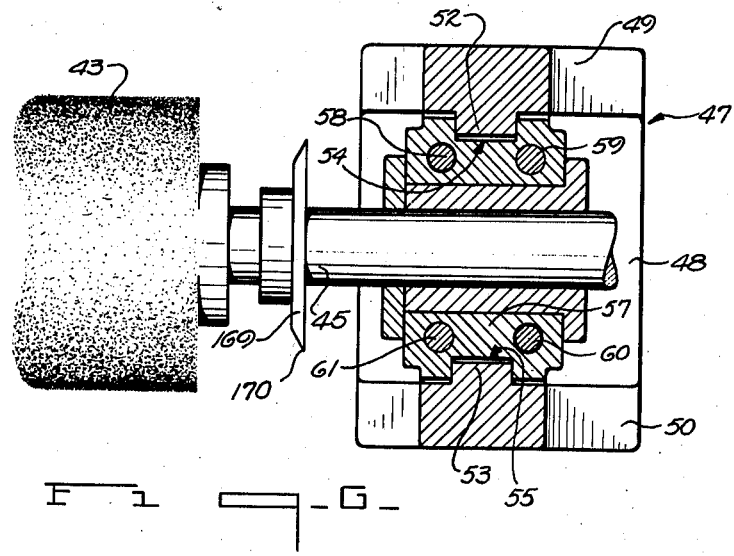
Figure 7:
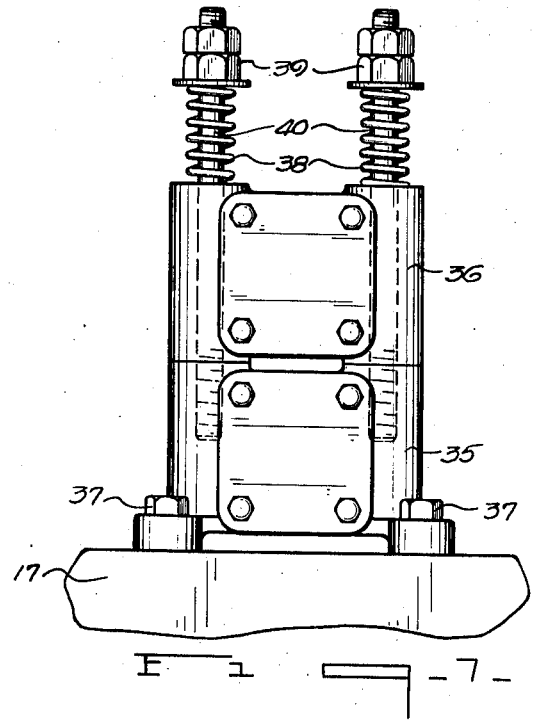

In the drawings forming a part of this application and wherein like numerals are employed to designate like parts throughout the same, Fig. 1 is a vertical longitudinal sectional view through the forward or receiving end of a washing machine constructed in accordance with the present invention, Fig. 2 is a similar view through the rear or discharge end thereof, Fig. 3 is a top plan view of the machine, partially in section, Fig. 4 is a section taken substantially on line 4—4 of Fig. 3, Fig. 5 is a section taken substantially on line 5—5 of Fig. 3, Fig. 6 is a section taken substantially on line 6—6 of Fig. 4, Fig. 7 is an end elevation of the mounting for the feeding rolls, Fig. 8 is a top plan view, partially in section, of the means for supplying the cleaning medium to the glass sheets, Fig. 9 is a section taken substantially on line 9—9 of Fig. 8, and Fig. 10 is a section similar to Fig. 2 but showing an alternative arrangement of the drying means.

In the accompanying drawings is shown a preferred form of the invention wherein is provided a rectangular supporting framework designated in its entirety by the numeral 15 and comprising a pair of relatively wide longitudinally extending parallel side members or castings 16 and 17, each of which is carried by a pair of longitudinally extending supporting beams 18 and 19 supported at their opposite ends and also intermediate their ends if desired by uprights or legs 20, the opposed legs at opposite sides of the frame being connected together by the transverse members 21 or braced in any other suitable manner. The horizontal side members 16 and 17 are secured to the supporting beams 18 and 19 by bolts or other suitable fastening elements 22 and 23 respectively (Fig. 5). Extending horizontally from and arranged in alignment with the side members 16 and 17 at the forward end of the machine are the rails 24 secured at their inner ends to the supporting beams 18 and supported at their outer ends in any desired manner. Similar rails 25 are carried by the supporting beams 18 at the rear end of the machine.

Arranged at the forward or receiving end of the machine are a plurality of horizontally aligned sheet receiving idler rolls 26, while a plurality of corresponding sheet delivering idler rolls 27 are arranged at the opposite end thereof. The idler rolls 26 and 27 are mounted upon shafts 28 rotatably journaled in bearings 29 carried by the rails 24 and 25 respectively.

Positioned between the idler rolls 26 and 27 are a plurality of pairs of horizontally aligned sheet supporting and feeding rolls 30, each pair including a lower roll 31 and an upper roll 32. The plurality of pairs of feeding rolls 30 are all mounted for rotatable movement at their opposite ends within bearing blocks supported upon the horizontal side members 16 and 17. Thus, the rolls 31 and 32 of each pair are carried upon shafts 33 and 34 (Fig. 4) journaled at each end in bearing blocks 35 and 36 respectively. As best shown in Fig. 7, the bearing blocks 35 for the lower rolls 31 are rigidly secured to the respective side member 16 or 17 by bolts or the like 37, while the bearing blocks 36 for the upper rolls 32 are loosely supported upon the lower bearing blocks 35. Passing loosely through each upper bearing block 36 and threaded within the corresponding lower bearing block 35 are the two bolts 38 which serve to secure the upper bearing block to the lower bearing block. However, due to the fact that the bolts 38 pass loosely through the upper bearing block, the said upper bearing block is permitted to move freely upwardly and downwardly upon the said bolts so as to allow the upper feed roll 32 to move toward and away from the lower feed roll 31. Threaded upon the upper ends of bolts 38 are nuts 39, and interposed between the nuts and upper bearing block are compression springs 40 which function to normally urge the latter downwardly against the lower bearing block. When the upper bearing block is held in engagement with the lower bearing block, the feed rolls 31 and 32 of each pair are also in engagement with one another but due to the provision of the springs 40 the rolls can be moved apart by the glass sheets passing through the machine. Thus, with such a construction, the feed rolls will firmly grip the sheets and carry them through the machine. The feed rolls, which are preferably of relatively soft rubber, also act as squeegees to remove excess water from the glass sheets as will be more clearly hereinafter apparent.

Arranged between certain pairs of feeding rolls 30 are a plurality of pairs of washing brushes 41, each pair including a lower brush 42 and an upper brush 43. Any desired number of pairs of washing brushes may, of course, be employed. These washing brushes are arranged alternately with the feeding rolls, with the brushes of each pair being superimposed, one below and one above the normal path of travel of the sheet so as to act upon opposite surfaces thereof simultaneously. The brushes of each pair are preferably mounted for vertical adjustment relative to the path of travel of the sheets to be washed whereby to compensate for wearing away of said brushes. Thus, the brushes 42 and 43 of each pair are carried by shafts 44 and 45 respectively, supported at their opposite ends within bearing housings 46 and 47 carried by the longitudinally extending side members 16 and 17 of the machine.

The particular mounting for the washing brushes is best illustrated in Figs. 4 and 6 and upon reference thereto it will be seen that each bearing housing 46 and 47 comprises a bottom 48 rigidly secured to the respective side member 16 or 17, spaced vertical side portions 49 and 50 and a top 51. The vertical side portions 49 and 50 have formed upon their inner surfaces vertical ribs 52 and 53 respectively which are received within corresponding grooves 54 and 55 formed in each of the bearing blocks 56 and 57 for the shafts 44 and 45 respectively of the lower and upper brushes 42 and 43. Passing downwardly through the top of the bearing housing are four bolts 58, 59, 60 and 61. The bolts 58 and 60 are threaded within the bearing block 57 for the upper brush 43, while the bolts 59 and 61 pass loosely downwardly through the upper bearing block and are threaded within the bearing block 56 for the lower brush 42. Thus, upon proper adjustment of the bolts 58 to 61, the bearing blocks 56 and 57 can be raised and lowered relative to one another to effect a corresponding raising and lowering of the rotatable washing brushes.

For the purpose of driving the pairs of washing brushes 31 and 32, there is arranged longitudinally of the machine to one side thereof a drive shaft 62 driven from a motor 63. This shaft extends through a plurality of housings 64, one of which is provided opposite one end of each pair of brushes 41. Mounted within each housing 64 beneath and above the shaft 62 and extending transversely thereof are the relatively short horizontal shafts 65 and 66 to which are keyed the worm gears 67 and 68 respectively which mesh with a worm 69 on shaft 62. The shafts 65 and 66 are connected to the adjacent ends of shafts 44 and 45 respectively by means of the universal connections 70 which are provided so that the upper and lower brushes can be adjusted vertically in the manner above described without affecting the driving thereof.

The feed rollers 31 and 32 are adapted to be preferably driven in substantially the same manner as the washing brushes from a line shaft 71 extending longitudinally of the machine at the side thereof opposite shaft 62 and extending through the housings 72 similar to housings 64 and within which are mounted the worms and worm gears for effecting the desired rotation of the shafts 33 and 34 of the feed rolls 31 and 32 respectively.

Positioned forwardly of the washing brushes 41 are one or a plurality of scrubbing units 73 which are adapted to act only upon the upper surfaces of the glass sheets. Since these scrubbing units are of the same construction, a detail description of only one will be given. Each scrubbing unit 73 comprises two transversely extending scrubbing members 74 and 75 arranged alternately with the upper feed rolls 32 and being connected together by the brackets 76. The scrubbing members 74 and 75 may consist of wooden strips having the lower faces thereof covered with a suitable cloth such as linen, canvas or the like 77. The scrubbing members 74 and 75 are carried by the supporting rods 78 and 79 respectively. The scrubbing members are adapted to oscillate back and forth over and in contact with the sheets being carried therebeneath by the feeding rolls, with the scrubbing members of each unit operating together, while the adjacent units operate in opposite directions.

That is, while one unit is being moved in one direction over the sheet the adjacent unit or units are being moved in the opposite direction.

Each supporting rod 78 and 79 of each scrubbing unit is secured at opposite ends within housings 80 and 81. As shown in Fig. 5 there is journaled within each housing a vertical freely rotatable shaft 82 extending upwardly through the bottom of said housing and also projecting there beneath. Secured to the lower end of shaft 82 is one end of a horizontal crank arm 83 which is secured at its opposite end to the upper end of a vertical shaft 84. The shaft 84 is offset with respect to shaft 82 and is journaled within a bearing housing 85 carried by the respective side member 16 or 17.

The two scrubbing members of each unit are driven simultaneously from the opposite ends thereof and, to this end there are arranged at opposite sides of the machine the two longitudinally extending line shafts 86 and 87, said shafts extending through the housings 85 and having keyed thereto spiral gears 88 which mesh with spiral gears 89 carried by the vertical shafts 84. Upon rotation of shafts 86 and 87, the spiral gears 88 will effect rotation of shafts 84 through gears 89 and rotation of shafts 84 will cause rotation of cranks 83 which will serve to impart an oscillatory movement to the scrubbing members.

The driving of the line shafts 86 and 87 is effected from a main drive shaft 90 (Fig. 2) which extends transversely beneath the machine and is supported at each end within a reduction gearing housing 91. This shaft also carries a pulley 92 about which is trained a belt 93 driven from any suitable source of power. Journaled within the housings 91 at opposite sides of the machine are the vertical shafts 94 and 95 (Fig. 3), said shafts being connected with drive shaft 90 through suitable speed reduction gearing located within said housings. The vertical shafts 94 and 95 carry at their upper ends bevel gears 96 and 97 respectively which mesh with bevel gears 98 and 99 keyed to relatively short horizontal shafts 100 and 101 respectively connected to shafts 86 and 87 by universal joints 102 and 103. Thus, upon operation of the drive shaft 90, rotation will be imparted through vertical shafts 94 and 95 and gears 96—98 and 97—99 to line shafts 86 and 87 to effect the desired oscillatory movement of the scrubbing units in the manner above described.

The line shaft 71 for driving the feed rolls 30 is also adapted to be driven from shaft 101 through spur gears 104 and 105, gear 104 being carried by shaft 101 and gear 105 by line shaft 71.

In order to support the glass sheets while being acted upon by the scrubbing units whereby to prevent breakage thereof, there are positioned between the lower feed rolls 31 beneath the scrubbing members 74 and 75 a series of relatively small idler rolls 106 carried by shafts 107 freely supported at their opposite ends in members 108 supported upon the side members 16 and 17 (Fig. 5).

The washing of the glass sheets is preferably accomplished with the aid of relatively hot water which is discharged upon the upper brushes 43 from a series of supply pipes 110, these pipes extending transversely of the machine and having a plurality of perforations therein, the supply of water to the glass being controlled by valves 111 interposed in pipes 110. Arranged above the machine is a hood 112 for catching and carrying away the vapors, steam etc. arising from the glass sheets during the washing thereof. The surplus water, dirt etc. is adapted to be caught within a metal pan or tank 113 carried by the supporting members 19 (Fig. 5).

After the sheets have been scrubbed, washed and then wiped by the squeegee action of the feed rolls 30 following the washing brushes 43, they are for the most part already dry due to the rapid evaporation of the hot water used and the wiping action of the feed rolls 30. However, some little water does remain upon the glass sheets, especially at the edges thereof, and it is therefore desirable to provide means for effecting a thorough drying of the sheets before being delivered from the machine. To accomplish this, any desired number of the upper feed rolls 32 at the rear end of the machine adjacent the idler rolls 27 may have trained thereabout an endless belt 114 of canvas or the like, said belt being also trained about a roller 115 carried upon shaft 116 which is supported at its opposite ends by rocker arms 117 being received within notches formed therein. The rocker arms 117 are pivoted intermediate their ends as at 118 to the upper ends of standards 119 and carry at their outer ends weights 120 which function to hold the belt 114 taut. As shown, the belt is trained about only two feed rolls 37 but may be trained about any number, as desired, and this belt is driven by the feed rolls about which it is trained. Thus, after the sheets have been scrubbed, washed, and wiped as above described, they are carried beneath the belt 114 which serves to dry the upper surfaces thereof. Also trained about any desired number of the lower feed rolls 31 and driven thereby is an endless belt 121 similar to belt 114 and adapted to dry the lower surfaces of the glass sheets.

The present invention further contemplates the provision of means for automatically discharging onto the glass at predetermined intervals and prior to being subjected to the action of the scrubbing units, a suitable cleaning medium in the form of a liquid solution. The means for accomplishing this is clearly illustrated in Figs. 1, 8 and 9 and is designated in its entirety by the numeral 122. The cleaning medium supply means is located above the machine at the forward end thereof and includes a preferably oval shaped receptacle 123 adapted to contain a supply of cleaning material 124 and being carried by the channel beams 125 and 126 secured at their opposite ends upon horizontal supports 127 carried by the vertical uprights 128 secured to the horizontal supporting beams 18 at opposite sides of the machine. The bottom of receptacle 123 is preferably provided with a pair of spaced outlets 129 (only one being shown in Fig. 9) through which the cleaning material is discharged onto to glass sheets.

Associated with each outlet and provided to control the flow of cleaning material therethrough is a vertical movable rod 130, said rod carrying at its lower end beneath the receptacle a cone-shaped distributing member 131. The rod 130 extends upwardly through a plate 132 and has secured to its upper end a collar 133. Encircling the rod and bearing at its upper and lower ends against the collar 133 and plate 132 is a compression spring 134 acting to normally urge the rod 130 upwardly to open the respective outlet 129 in the bottom of the receptacle. However, the rod is held downwardly and the outlet closed in a manner to be more fully hereinafter described.

Encircling the rod 130 is a sleeve 135 having secured to its lower end the agitating blades 136. The upper end of the sleeve is journaled in a bearing 137 and has keyed thereto a worm gear 138 with which meshes a worm 139 carried by horizontal shaft 140 journaled in a housing 141. The shaft 140 also carries intermediate its ends (Fig. 1) a worm gear 142 meshing with a worm gear 143 keyed to the lower end of a vertical shaft 144 which carries at its upper end a bevel gear 145 meshing with a bevel gear 146 keyed to a shaft 147 journaled in a housing 148. The shaft 147 projects at opposite ends beyond housing 148 and carries at each end a cam 149. Also carried at each end of the housing 148 is a bracket 150 to which is pivotally mounted intermediate its ends as at 151 a rocker arm 152, the forward end portion 153 of which carries a vertical bolt 154 engaging the top of the corresponding vertical rod 130, while the opposite end 155 of the rocker arm carries a roller 156 engaging the periphery of cam 149. As pointed out above, the compression spring 134 normally tends to urge rod 130 upwardly to open the outlet 129 in the bottom of the receptacle 123. However, when the roller 156 on rocker arm 152 is in engagement with the cam 149 as shown in Fig. 8, the said arm 152 is rocked about its pivot in such a manner that the bolt 154 engaging the upper end of rod 130 will force the same downwardly against the action of spring 134 and maintian the outlet 129 in the bottom of the receptacle closed. However, when the cam 149 is rotated so that the roller 156 rides over the cut-away or low portion 157 of cam 149, the arm 152 will be rocked in the opposite direction by the action of spring 134 which will immediately force the rod 130 upwardly to open the outlet in the bottom of the receptacle and, as long as the outlet is open, the cleaning material will flow from the receptacle downwardly over cone 131 onto the upper surfaces of the glass sheets. As soon as the cam is rotated so that the roller 156 rides up on the surface 158 thereof, the arm 152 will again be rocked about its pivot, whereupon the bolt 154 will force the rod 130 downwardly to close the outlet 129.

The shaft 147 carrying the cams 149 may be driven at any desired speed depending upon the rapidity with which it is desired to feed the cleaning material onto the glass. By adjusting bolt 154, the extent of vertical movement of rod 130 may be varied as desired. The shaft 140 is driven from a motor 159 by means of a belt 160 trained about a pulley 161 on the motor shaft and also about a pulley 162 on the said shaft 140.

The operation of the machine above described may be briefly set forth as follows:—As has already been pointed out, the machine herein provided is primarily adapted for use in the washing and cleaning of glass sheets which are to be subsequently used in the production of laminated glass. Two sheets of glass are ordinarily used in the manufacture of each sheet of laminated glass and these two glass sheets which are to be later united are preferably passed through the machine side by side with the faces wh'ch are to be joined to the non-brittle material uppermost. In other words, the sheets are preferably passed through the machine in pairs although this is, of course, not absolutely necessary. However, by passing the sheets through the machine in pairs, the sheets wh'ch are to be joined may be kept together. The glass sheets, after being inspected, are preferably placed in sets in a rack adjacent the forward or receiving end of the washing machine. The operator then picks up one set of sheets including the individual sheets 163 and 164 and places them in a substantially vertical position upon the idler rolls 26 at the forward end of the machine as shown in Figs. 1 and 8. Otherwise stated, the sheets are supported on edge in contact with one another and the operator then moves the sheets forwardly while maintaining them in this position until they abut the horizontal bumper bar 165 extending transversely of the machine and carried by the horizontal supports 127. When the sheets are moved to abut the bumper bar, they are then spread apart and laid horizontally upon the idler rolls with the surfaces which were adjacent one another positioned uppermost. The sheets are then delivered into the machine, being gripped by and between the feed rolls 31 and 32 and carried continuously therethrough, said sheets being subjected during such travel successively to scrubbing, washing, wiping and drying treatments in the manner above described.

The operation of the cleaning material feeding means 122 is so timed that as the sheets pass therebeneath the rod 130 will be raised upwardly to cause a periodic discharge of the cleaning material onto the glass, the cone-shaped members 31 serving to distribute the material over a relatively large area of glass. The cleaning material used may consist of a solution of "Bon-Ami" or the like and water and the constant rotation of the agitating blades 136 will serve to prevent the "Bon-Ami" from settling to the bottom of the receptacle. Of course, any desired kind of cleaning material can be used. After the cleaning material has been discharged onto the glass sheets, the said sheets are carried beneath the scrubbing units 73 and these units, oscillating back and forth over the glass, will serve to effect a thorough scrubbing of the upper surfaces thereof. After the sheets have been scrubbed, they are carried between the pairs of washing brushes 41 which serve to effect the desired washing thereof, such washing being aided by the use of relatively hot water supplied to the upper brushes from pipes 110. The water flowing off of the glass is caught within the pan 113 within which the lower brushes are immersed.

After the sheets are carried beyond the washing brushes, they are passed between a plurality of pairs of feed rolls 30 and these feed rolls, acting as squeegees, function as wipers to remove any surplus water from the sheets. If desired, after washing with relatively hot water, the sheets can be rinsed with relatively cooler water discharged upon the upper surfaces thereof from the transversely extending pipes 166. Although by the time the sheets reach the belts 114 and 121 they are, for the greater part, already dry, yet a certain amount of water seems to cling to the edges of the sheets and therefore, by passing the sheets between the belts 114 and 121, this water will be removed and the sheets delivered from the machine both clean and dry. When the sheets are delivered onto the idler rolls 27, another operator places his two hands beneath the sheets and raises them upwardly toward one another to a vertical position, as shown in Fig. 2, so that the upper faces of the sheets which have been washed will be brought into contact with one another so that such surfaces will be kept clean until they are united with the non-brittle material.

In order to prevent wearing away of the idler rolls 26 and 27 by the edges of the glass sheets as they are moved thereover, a suitable rubber sleeve or the like 167 may be slid over each idler roll to support the sheets while on edge, and a similar sleeve 168 may be slid over the bumper bar 167. Also, in order to prevent any of the water from creeping outwardly along the shafts of the brushes and feed rolls and getting into the bearings therefor, the said shafts may be provided with suitable baffles 169, the baffles for the upper and lower shafts of each pair being in staggered relation and terminating at an edge 170 (Fig. 6). Thus, the water running to these relatively thin edges will drip downwardly therefrom into the pan 113.

In Fig. 10 is illustrated an alternative arrangement which may be used for drying both sides of the glass sheets after the washing operation and which may be substituted for the endless belts 114 and 121 shown in Fig. 2. In this form of the invention, there is carried by the side rails 25 a plurality of transversely arranged horizontal platforms 173, and interposed between adjacent platforms are suitable rolls 174 positively driven in any desired manner. Mounted at the opposite ends of the series of platforms 173 are the drums 175 and 176 and trained about these drums is a belt 177, the upper flight of said belt passing over the platforms 173 and roller 174 and adapted to support and carry the glass sheets thereupon. The belt is held taut by a roller 178 and may be driven from one of the supporting rolls 174 through a chain drive or the like 179 associated with drum 175. Mounted above the table are one or a plurality of rollers 180, each including a wooden core covered with a suitable material 181, preferably linen or the like. Each roller is carried by a shaft 182 loosely received at its opposite ends within substantially U-shaped members 183 secured to uprights 184. The U-shaped members 183 permit the roll to move freely vertically and also permit of the roll a limited sidewise movement but, at the same time, maintain the position of the roller within certain definite limits. The canvas belt 177 and linen covering 181 of the rollers are adapted to effect a thorough drying of the lower and upper surfaces of the glass sheets as they are passed therebetween.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a sheet glass washing machine, means for conveying the sheets in a definite substantially horizontal path, means for applying a cleaning composition to the glass, a plurality of transversely arranged pads engaging the upper surfaces of the glass sheets for distributing the cleaning composition thereupon and for simultaneously scrubbing the same, means for moving said pads transversely of the path of travel of the glass sheets, and means for subsequently washing the sheets.

2. In a sheet glass washing machine, means for conveying the sheets in a definite substantially horizontal path, means for applying a cleaning composition to the glass, a plurality of transversely arranged cloth-covered pads engaging the upper surfaces of the glass sheets for distributing the cleaning composition thereupon and for simultaneously scrubbing the same, means for moving said pads transversely of the path of travel of the glass sheets, and a plurality of rotatable brushes for washing the sheets.

3. In a sheet glass washing machine, means for conveying the sheets in a definite substantially horizontal path, means for applying a cleaning composition to the glass, a plurality of transversely arranged pads engaging the upper surfaces of the glass sheets for distributing the cleaning composition thereupon and for simultaneously scrubbing the same, means for moving said pads transversely of the path of travel of the glass sheets, means for washing opposite surfaces of the sheets simultaneously during the travel thereof, means for then wiping the sheets, and movable means engaging opposite surfaces of the glass sheets for subsequently drying the same.

4. In a sheet glass cleaning machine, means for conveying the sheets in a definite substantially horizontal path, means for applying a cleaning composition to the glass, a transversely arranged pad engaging the upper surfaces of the glass sheets for distributing the cleaning composition thereupon and for simultaneously scrubbing the same, means for moving said pad transversely of the path of travel of the glass sheets, and means for subsequently removing the cleaning composition from said sheets during the travel thereof.

5. In a sheet glass cleaning machine, means for conveying the sheets in a definite substantially horizontal path, means for applying a cleaning composition to the glass, a transversely arranged cloth-covered pad engaging the upper surfaces of the glass sheets for distributing the cleaning composition thereupon and for simultaneously scrubbing the same, means for moving said pad transversely of the path of travel of the glass sheets, and movable means for subsequently removing the cleaning composition from said sheets during the travel thereof.

6. In a sheet glass washing machine, means for conveying the sheets in a definite substantially horizontal path, means for applying a cleaning composition to the glass, a transversely arranged pad engaging the upper surfaces of the glass sheets for distributing the cleaning composition thereupon and for simultaneously scrubbing the same, means for moving said pad transversely of the path of travel of the glass sheets, means for washing the upper surfaces of the glass sheets during the travel thereof, means for then wiping the sheets, and movable means engaging the upper surfaces of the glass sheets for subsequently drying the same.

HENRY O. KRANICH.